United States Patent [19]
Kwon

[11] Patent Number: 6,069,103
[45] Date of Patent: May 30, 2000

[54] LTD RESISTANT, HIGH STRENGTH ZIRCONIA CERAMIC

[75] Inventor: Oh-Hun Kwon, Westboro, Mass.

[73] Assignee: Saint-Gobain/Norton Industrial Ceramics Corporation, Worcester, Mass.

[21] Appl. No.: 08/933,716

[22] Filed: Sep. 19, 1997

Related U.S. Application Data

[63] Continuation of application No. 08/678,220, Jul. 11, 1996, abandoned.

[51] Int. Cl.$^7$ .................................................. C04B 35/48
[52] U.S. Cl. ............................................ 501/103
[58] Field of Search ............................................. 501/103

[56] References Cited

U.S. PATENT DOCUMENTS

| | | | |
|---|---|---|---|
| 4,360,598 | 11/1982 | Otagiri et al. | 501/103 |
| 4,525,464 | 6/1985 | Claussen et al. | 501/103 |
| 4,610,967 | 9/1986 | Imanishi et al. | 501/103 |
| 4,716,869 | 1/1988 | Dworak et al. | 501/103 |
| 4,722,915 | 2/1988 | Soma et al. | 501/103 |
| 4,742,030 | 5/1988 | Masaki et al. | 501/105 |
| 4,748,138 | 5/1988 | Watanabe et al. | 501/87 |
| 4,820,667 | 4/1989 | Tsunekawa et al. | 501/104 |
| 5,011,673 | 4/1991 | Kriechbaum et al. | 501/104 |
| 5,279,995 | 1/1994 | Tanaka et al. | 501/103 |
| 5,296,421 | 3/1994 | Nishida et al. | 501/105 |

FOREIGN PATENT DOCUMENTS

| | | |
|---|---|---|
| 0 131 895 | 1/1985 | European Pat. Off. . |
| 62-78715 | 4/1987 | Japan . |
| 62-78716 | 4/1987 | Japan . |
| 1-112518 | 5/1989 | Japan . |

OTHER PUBLICATIONS

Katagiri, Gen et al, Direct Determination by a Raman Microprobe of the Transformation Zone Size in Y2O3 Containing Tetragonal ZRO2 Polycrystals, "Advances in Ceramics", vol. 24: Science and Technology of Zirconia III Copyright 1988, The American Ceramic Society, Inc., pp. 537–544. (no month).

Lange, F.F. et al, Processing–Related Fracture Origins: IV, Elimination of Voids Produced by Organic Inclusions, J. Am. Ceram. Soc., 69 [1] 66–69 (1986). (Jan.).

Rieth, Paul H. et al, Ultrafine–Grained Yttria–Stabilized Zirconia, Ceramic Bulletin, vol. 55, No. 8 (1976) pp. 717–722. (no month).

Sato, T. et al, Improvement to the Thermal Stability of Yttria–Doped Tetragonal Zirconia Polycrystals by Alloying with Various Oxides, "Advances in Ceramics", vol. 24: Science and Technology of Zirconia III Copyright 1988, The American Ceramic Society, Inc., pp. 29–37. (no month).

Stoto, Tiziana et al, Influence of Residual Impurities on Phase Partitioning and Grain Growth Processes of Y–TZP Materials, J. Am. Ceram. Soc., 74 [10] 2615–21 (1991). Oct.

Sung, Jason et al, Strength Improvement of Yttria–Partially–Stabilized Zirconia by Flaw Elimination, J. Am. Ceram. Soc., 71 [9] 788–95 (1988). Sep.

Toyo Soda Zirconia Powder, TSK Ceramics Technical Bulletin, Mar. 31, 1986.

Tsukuma, K. et al, Thermal and Mechanical Properties of Y2O3–Stabilized Tetragonal Zirconia Polycrystals, "Advances in Ceramics", vol. 12, Copyright 1984, pp. 382–390. no month.

Tsukuma, Koji et al, Strength and Fracture Toughness of Isostatically Hot–Pressed Composites of AL2O3 and Y2O3–Partially–Stabilized ZRO2, J. Am. Ceram. Soc. 68 [1] C–4—C–5 (1985). Jan.

Tsukuma, Koji et al, Hot Isostatic Pressing of Y2O3–Partially Stabilized Zirconia, Am. Ceram. Soc. Bull. 64 [2] 310–13 (1985). (no month).

Tsukuma, Koji et al, Mechanical Property and Microstructure of TZP and TZP/AL2O3 Composites, Mat. Res. Soc. Symp. Proc., vol. 78, 1987 Materials Research Society, pp. 123–135. (no month).

Wang, Jia, Effect of Pressing Method on Organic Burnout, J. Am. Ceram. Soc., 75 [9] 2627–29 (1992) Sep.

*Primary Examiner*—Paul Marcantoni
*Attorney, Agent, or Firm*—Thomas M. DiMauro

[57] ABSTRACT

This invention relates to a densified zirconia ceramic partially stabilized by between 3.8 mol % and 4.4 mol % yttria, wherein the ceramic has a flexural strength of at least 900 MPa after immersion in liquid water having a temperature of 250° C. for 48 hours in an autoclave.

22 Claims, No Drawings

LTD RESISTANT, HIGH STRENGTH ZIRCONIA CERAMIC

This application is a continuation of application Ser. No. 08/678,220, filed Jul. 11, 1996, now abandoned.

BACKGROUND OF THE INVENTION

The plunger is a key component in industrial fluid delivery systems requiring precision flow control. Simply, a plunger is a solid ram which is housed within a necked, hollow bore. When fluid contained in the bore must be ejected, the plunger is moved toward the necked end of the bore and forces fluid out the necked end. Because the bore diameter at the necked end can be made very small relative to the plunger diameter, fluid can be ejected from the bore in extremely accurate amounts.

In many industrial applications, the plunger must be both strong and resistant to degradation in severe environments and so ceramics have been explored as candidate plunger materials. Because its thermal expansion coefficient is close to that of many metals, zirconia has been touted as a potential ceramic plunger.

One industrial application of plungers appears to be particularly suited for zirconia ceramics. High pressure injection systems in diesel engines currently require plungers (or "timing plungers") which are strong, chip-resistant and degradation-resistant. Since strength is typically associated with critical flaw size and chips are associated with porosity and large grain size, the zirconia selected for this particular application should have a low porosity and a small average grain size.

Currently, two types of zirconia ceramics have been examined for their utility as timing plungers for the high pressure, diesel injection system. The first is magnesia partially stabilized zirconia ("Mg-PSZ"). Mg-PSZ typically contains at least about 10 w/o magnesia, about 1% to 3% porosity, and often has a grain size of about 50 microns. Because of its large grain size, Mg-PSZ suffers from low strength (i.e., about 550 MPa) and chipping.

The second type of zirconia examined for plunger applications is zirconia which has been partially stabilized by rare earth oxides ("YTZP"). See, for example, Japanese Patent Publication JP-A-58156578 (KoKoku 90046538), which discloses a YTZP zirconia sliding material useful as a plunger which contains at least 50 mol % tetragonal and at most 10 mol % monoclinic zirconia. The commercial embodiments of YTZP typically contain 2.5–3.0 mol % yttria, are much stronger than Mg-PSZ, have a smaller grain size than Mg-PSZ, and have less porosity than Mg-PSZ and so is an attractive candidate for use as a plunger. However, it is known that YTZP's tend to suffer from low temperature degradation ("LTD") at temperatures of 100–300° C., resulting in a severe loss of strength.

Investigators have attempted many solutions to the LTD problem of yttria stabilized zirconia, the most popular routes including either reducing grain size or increasing stabilizer concentration. Some investigators have found that grain size reduction to about 0.2 microns reduces LTD but at the expense of lowering toughness to less than about 4.0 MPa $m^{1/2}$. Other investigators have reported no gain in LTD resistance using submicron zirconia. Investigators who have increased the yttria content to about 3.5 mol % have not produced the required LTD resistance, while investigators who have increased the stabilizer content to about 5 mol % have reported increased LTD resistance but at the expense of reducing fracture toughness to less than about 3 MPa $m^{1/2}$.

In sum, the prior art has recognized the strength problems associated with plungers made from Mg-PSZ and has sought to replace it with YTZP. However, since the art has also found that:

a) 3 mol % and 3.5 mol % YTZP possess poor LTD resistance, b) 5 mol % YTZP possesses low toughness, and c) grain size manipulation produces uncertain benefits and toughness problems, the art has provided no guidance as to how to obtain a strong (i.e., greater than 900 MPa), tough (greater than 4.0 MPa $m^{1/2}$), LTD resistant material. Therefore, plunger manufacturers have continued to select Mg-PSZ as their preferred material despite its low strength.

Accordingly, there is a need for a zirconia-based material which fulfills the plunger requirements of high LTD resistance, high strength, low porosity and small grain size.

SUMMARY OF THE INVENTION

In accordance with the present invention, there is provided a sintered zirconia ceramic partially stabilized by between 3.8 mol % and 4.4 mol % yttria, wherein the ceramic has a flexural strength of at least 900 MPa after immersion in liquid water having a temperature of 250° C. for 48 hours in an autoclave.

Also in accordance with the present invention, there is provided a plunger for a fuel injector assembly of an internal combustion engine, the plunger being capable of reciprocal axial sliding movement against an axial bore of an injector body, wherein the timing plunger consists essentially of a densified zirconia ceramic partially stabilized by between 3.8 mol % and 4.4 mol % yttria. Preferably, the zirconia ceramic consists essentially of a densified zirconia ceramic partially stabilized by between 3.9 mol % and 4.1 mol % yttria, and the ceramic has a flexural strength of at least 900 MPa after immersion in liquid water having a temperature of 250° C. for 48 hours in an autoclave.

Also in accordance with the present invention, there is provided a method of delivering a fluid, which comprises the step of:

a) providing a plunger capable of reciprocal axial sliding movement against an axial bore and having a first end, the bore containing the fluid, and a) advancing the first end of the plunger through the axial bore, thereby displacing the fluid from the bore, wherein the fluid comprises water and has a temperature of at least about 100° C., and wherein at least the first end of the plunger consists essentially of a partially stabilized zirconia ceramic comprising between 3.8 and 4.4 mol % yttria.

Also in accordance with the present invention, there is provided a method of abrading a substrate, comprising the step of:

a) abrading the substrate with a sharp edge, the sharp edge consisting essentially of polycrystalline zirconia partially stabilized by between 3.8 mol % and 4.4 mol % yttria. Preferably, the sharp edge has an angle of no more than 45 degrees, preferably less than 30 degrees.

Also in accordance with the present invention, there is provided a method of contacting LTD resistant zirconia with water, comprising the steps of:

a) providing a densified ceramic consisting essentially of zirconia partially stabilized by between 3.8 mol % and 4.4 mol % yttria, and b) contacting the ceramic with a liquid comprising water, wherein the liquid has a temperature of at least about 37° C. In preferred embodiments, the ceramic contacts the liquid within a human body, and the ceramic is preferably shaped in the form of a sphere having a recess adapted to fit upon a trunnion.

Also in accordance with the present invention, there is provided a method of contacting LTD resistant zirconia with steam, comprising the steps of:

a) providing a densified ceramic consisting essentially of zirconia partially stabilized by between 3.8 mol % and 4.4 mol % yttria, and b) contacting the ceramic with saturated steam having a temperature of at least 100° C. In one preferred embodiment, the saturated steam has a temperature of between 110° C. and 150° C., while in another the saturated steam has a temperature of between 200° C. and 250° C. In some embodiments using saturated steam, the ceramic has a surface which is contaminated with biological material.

Also in accordance with the present invention, there is provided a method of contacting LTD resistant zirconia with a high temperature atmosphere, comprising the steps of:

a) providing a densified ceramic consisting essentially of zirconia partially stabilized by between 3.8 mol % and 4.4 mol % yttria, and b) contacting the ceramic with the atmosphere, the atmosphere consisting essentially of an inert gas at a temperature of at least 400° C. (preferably, at least 700° C., but more preferably between 700° C. and 1000° C.).

In preferred embodiments, the ceramic is a disk having a diameter of at least 10 mm and a thickness of no more than 1 mm.

Also in accordance with the present invention, there is provided a method of lapping LTD resistant zirconia, comprising the steps of:

a) providing a densified ceramic consisting essentially of zirconia partially stabilized by between 3.8 mol % and 4.4 mol % yttria, the ceramic having a surface, and b) lapping the surface with an aqueous abrasive slurry.

Also in accordance with the present invention, there is provided a method of imparting a hertzian stress upon LTD resistant zirconia, comprising the steps of:

a) providing a densified ceramic consisting essentially of zirconia partially stabilized by between 3.8 mol % and 4.4 mol % yttria, the ceramic having a sliding and/or rolling surface (and is preferably a race or a bearing ball), and b) providing rolling contact between the sliding surface and a substrate, thereby producing a hertzian stress upon the sliding surface.

DETAILED DESCRIPTION OF THE INVENTION

It has been found that certain densified zirconias which are partially stabilized by between 3.8 mol % and 4.4 mol % yttria possess a vastly superior resistance to low temperature degradation than do zirconias partially stabilized with greater or lesser amounts of yttria. When a composition of the present invention is placed in an autoclave and substantially immersed in the liquid portion thereof at between 200° C. and 250° C. for about 48 hours, the flexural strength of the resulting ceramic is at least about 1100 MPa, which is about 57% greater (i.e., about 400 MPa higher) than similar zirconias having 3.75 mol % or 4.5 mol % yttria. The high LTD resistance of this material, combined with its adequate as-received strength and toughness, make it an attractive candidate for use as a timing plunger in automotive applications.

Moreover, the discovery of a narrow window of yttria content, i.e., a critical range, leading to high LTD resistance is unexpected in light of the conventional teachings in the art. The skilled artisan would expect YTZP compositions of at least 4.5 mol % yttria to experience less LTD degradation than compositions of the present invention, as the greater yttria content would be expected to provide greater stabilization against conversion to monoclinic zirconia. However, the opposite is true.

Without wishing to be tied to a theory, it is believed that the kinetics of partitioning plays a role in this phenomenon. Partitioning is a strength-degrading phenomenon in which zirconia grains having a slightly elevated yttria content pull yttria from neighboring grains to become cubic grains, while causing the depleted neighboring grains to transform to monoclinic. It is believed the kinetics of partitioning is faster for YTZP's having at least 4.5 mol % in the specific window of 200° C. to 250° C. liquid water in an autoclave than for compositions of the present invention.

Of interest, the superior LTD resistance of the compositions of the present invention is not clearly borne out in every conventional LTD test environment. For example, exposing YTZP's of varying composition (including 3.75 mol %, 4 mol % and 4.5 mol %) to air at 20° C., 150° C., 200° C. and 250° C. for one week did not clearly reveal the superior LTD resistance of the 4 mol % composition. Nor did the 4 mol % composition show superior results when immersed in liquid water at 20° C. for 48 hours in an autoclave. Only somewhat superior results were found after immersion in 300° C. liquid water for 48 hours in an autoclave. Although only the tests using 200° C. and 250° C. liquid water for 48 hours in an autoclave clearly showed the distinctly superior nature of the present invention, it is believed that performing the lower temperature tests for longer periods would likely reveal a superiority of the YTZP compositions having about 4 mol % yttria, and that the higher temperature tests (i.e., between about 300° C. and about 500° C.) would consistently show the compositions of the present invention to be superior, albeit in a less dramatic manner.

The composition of the material of the present invention is a densified zirconia ceramic partially stabilized by between 3.8 mol % and 4.4 mol %, preferably between 3.9 and 4.1 mol %, and more preferably about 4 mol % yttria. In some embodiments, the yttria content of the material of the present invention is within the range of 3.8 mol % to 4.4 mol % of the ceramic, but is not within the range of 3.9 mol % to 4.1 mol % (i.e., it is within the ranges of 3.8 mol % to less than 3.9 mol %, and more than 4.1 mol % to 4.4 mol %). In other embodiments, the yttria content of the material of the present invention is within the range of 3.9 mol % to 4.1 mol % of the ceramic, but is not within the range of 3.95 mol % to 4.05 mol % (i.e., it is within the ranges of 3.9 mol % to less than 3.95 mol %, and more than 4.05 mol % to 4.1 mol %).

In some embodiments, the YTZP starting powder may be 4Y-TZP, a 4 mol % yttria-containing zirconia powder available from Z-Tech of Bow, N.H. In order to control impurity levels, the zirconia powder should have a metal oxide impurity content of less than 0.25 w/o, preferably less than 0.1 w/o, more preferably less than 0.05 w/o. Accordingly, highly pure, chemically-derived YTZP powders having the desired yttria level and available from Daiichi Kigensho K. K. of Osaka, Japan, may be selected to provide the high purity level.

In one preferred method of making the YTZP of the present invention, rare earth oxide powder and zirconia powder are mixed to provide a mixture having between 3.8 mol % and 4.4 mol % yttria. The mixture is spray dried to produce 50 to 150 um granules and an external lubricant (such as butyl stearate) is added to the powder to eliminate problems with cracking during cold pressing. The spray dried mixture is first uxiaxially pressed at about 40 MPa and then cold isostatically pressed ("cipped") at about 200 MPa to form a green body. The green body is sintered at between about 1300° C. and 1500° C. for about 1–4 hours to achieve a density of at least 95%. The sintered piece is hipped in an inert gas such as argon at between 1300° C. and 1500° C. for between 0.5 and 4 hours to achieve a density of at least 99.9%.

Preferably, the hipped body has an impurity content of less than 0.25 weight percent ("w/o"). For the purposes of the present invention, the term "impurity" includes at least the compounds of sodium (Na), silicon (Si), potassium (K), titanium (Ti), vanadium (V), chromium (Cr), manganese (Mn), iron (Fe), cobalt (Co), nickel (Ni), copper (Cu), and zinc(Zn). The weight percent of these impurities is measured as impurity oxides in their most oxidized state. For example, the iron impurity is calculated as Fe2O3.

More preferably, undesirable inclusions in the hipped body (which typically derive from the impurities and are present as pockets of a second oxide phase) are characterized by a mean diameter of no more than 0.5 um.

It is believed that impurities impair the strength of YTZP by two routes. In the first route, the impurities produce significant pockets of a second oxide phase which act as inclusions. These inclusions tend to form during the sintering portion of a sinter-hip process and are typically present at grain boundaries in diameters on the order of 0.5 to 2 um. When present in clusters, these inclusions will act like a flaw of about 50 um.

In the second route, the impurities produce pores. During the hot isostatic pressing ("hip") portion of the sinter-hip process (which typically involves a 200 MPa argon environment), the reducing environment reduces a significant portion of the metals in the oxide impurity pockets. This reduction dissociates the metal oxide compounds, and the metal ions diffuse into the zirconia lattice while the oxygen ions react with fugitive carbon to form CO which escapes the zirconia body. The end result of these migrations is that a pore on the order of 1 um is formed in the dense zirconia body which can not be closed by hipping overpressure. When present in clusters, such pores act as flaws on the order of 50 um.

Whether the impurities produce pores or second oxide phase pockets, it has now been recognized that extreme care must be taken to restrict the level of impurity in the raw powder and to densify the green body without using additional sintering aids. In some embodiments, the present invention uses a YTZP starting powder which has no more than 0.25 w/o, preferably no more than 0.1 w/o, and more preferably no more than 0.05 w/o, metal oxide impurity in order to prevent substantial formation of second oxide phase and/or pore clusters. One such powder is HSY-4.0, a highly pure YTZP powder manufactured by Daiichi Kigensho K. K. of Osaka, Japan, having about 0.01 w/o impurity. Providing a starting YTZP powder having less than 0.25 w/o impurity will help prevent the formation of second oxide phase pockets having a mean diameter of more than 0.3 um and pores having a mean diameter of more than 0.1 um.

The second processing requirement that has been newly recognized as necessary is complete (i.e., more than 99.5%) binder burnout. Although not disclosed in prior art YTZP publications, typical YTZP production includes use of a binder to assist in green body formation which must then be burned from the green body prior to sintering. This burnout step is typically undertaken in air at about 500° C. for about 2 hours. However, it is believed this conventional burnout procedure removes only about 99% of the binder from the green body, thus leaving the remaining 1% of the binder in the green body as char. This char becomes trapped in the densified ceramic along with residual oxygen when subsequent sintering forms a skin on the surface of the ceramic, the char and oxygen combine to produce products of combustion, and the space formerly occupied by the char becomes a pore which is not removed by hipping. When these conventionally produced pores (which are typically on the order of 1–3 um) are present in clusters, they act as a flaw of about 50 um. In order to completely eliminate the binder, the preferred embodiment of the present invention provides a binder burnout step wherein the green body is subjected to a soak of at least 500° C. to about 800° C. for at least 4 hours. This is preferably accomplished by subjecting the green piece to a slow (1–2° C./min) ramp from room temperature to about 600° C., soaking at 600° C. for at least about 4 hours, followed by a slow ramp to the desired sintering temperature. It is believed the longer time and higher temperatures associated with this step provide a binder burnout of at least about 99.5%, resulting in a YTZP body having no more than 0.1 v/o porosity characterized by a mean pore diameter of no more than 0.1 um.

Preferably, the present invention includes less than 0.3 w/o Al, measured as alumina. Without wishing to be tied to a theory, it is believed allowing more than 0.3 w/o alumina causes an undesirable frequency of large, hard inclusions. It is also preferable that the present invention include less than about 0.25 w/o total Mg and Ca, as MgO and CaO. It is believed that allowing more than a total of 0.25 w/o of these compounds causes an undesirable frequency of soft inclusions.

More preferably, the present invention includes less than 0.1 w/o halides, measured as HX. It is believed that allowing more than 0.1 w/o halides causes undesirable residual porosity.

Preferably, the sinter body also has less than 0.25 total w/o of lithium (Li), boron (B), scandium (Sc), Ga, Ge, Se, Sr, Nb, Mo, In, Sn, Ba, Ta, W, Pb, and Bi, measured as metallic oxides in their most oxidized states.

It is believed that sinter-hipping the green body is also needed to attain the desired low porosity and to destroy the vast majority of agglomerates. In one preferred embodiment, the green piece is sintered at between 1300° C. and 1500° C. for about 1 to 5 hours in air to produce a density of at least about 95% and then hipped in 200 MPa argon at about 1300° C. to 1450° C. for about 0.5 to 4 hours to produce a density of at least about 99.9%, a porosity of less than 0.1 v/o and a mean pore size of less than 0.1 um.

The densified YTZP zirconia material of the present invention typically has a toughness of at least about 4 MPa $m^{1/2}$, preferably at least about 4.8 MPa $m^{1/2}$ (as measured by the Chantikul indentation strength method as disclosed in the *Journal of the American Ceramics Society,* 64(9), 1981, pp. 539–44), a grain size of less than 1 micron, a four point flexural strength of at least 900 MPa, preferably at least 1000

MPa, a 1 kg Vickers hardness of at least 13 GPa, preferably at least 13.5 GPa, and a density of at least 99.9% of theoretical density. In some embodiments, it has a flexural strength of at least 900 MPa after immersion in 300° C. liquid water for 48 hours in an autoclave and a flexural strength of at least 1100 MPa after immersion in 200–250° C. liquid water for 48 hours in an autoclave. It typically has less than 0.1 v/o porosity and the pores are typically no more than 0.1 um in mean diameter. There is typically less than 0.25 v/o second oxide phase of the densified ceramic which is present as inclusions, and these inclusions are typically less than 0.1 um in mean diameter. The densified ceramic typically contains at least about 70% tetragonal zirconia, less than 5% monoclinic zirconia, with the balance being cubic zirconia.

Because the zirconias of the present invention possess high strength, adequate toughness and good LTD resistance, it is believed they are particularly suited for use in applications involving high stress and/or hot, humid environments. Some of these applications include surgical tools which require sterilization, disk substrates of a disk drive, rolling and sliding bearing elements and races, knife edges, valves and plungers.

The present invention is preferably used as a timing plunger in an open nozzle unit fuel injector with a timing assembly of the type that includes the timing plunger. One type of fuel injector includes a body and an injector nozzle which are axially aligned and held together by a retainer. An axial bore extends throughout the length of the body, and a plurality of spaced injection orifices in a nozzle is provided at the injector cup terminus to optimize fuel injection. The timing plunger reciprocates axially within the injector along with a link that is engaged by one end of a rocker lever. The other end of the rocker lever is drivingly connected to the camshaft via a pushtube. The rocker lever typically applies both axial and tangential loads to the timing plunger during engine operation. Pressure is generated by the timing plunger's downward stroke as it travels toward the injector nozzle, resulting in a load acting on the timing plunger in an upward axial direction, away from the nozzle and toward the rocker lever. The ceramic timing plunger is typically sized relative to the injector body bore to provide a diametrical clearance of 2 to 3 um. During typical use, the timing plunger is exposed to an environment of saturated steam having of temperature of at least 100° C.

EXAMPLE I

HSY-4.0, a highly pure zirconia powder containing about 4 mol % yttria and available from Daiichi was cold uniaxially pressed at about 40 MPa and then cipped at about 200 MPa to form a green body. Prior to densification, a complete binder burnout step was undertaken by subjecting the green body to a slow (1–2° C./min) ramp from room temperature to about 600° C., soaking at 600° C. for at least about 4 hours, followed by a slow ramp to the desired sintering temperature. The sintering soak was performed at between about 1300° C. and 1500° C. for about 1–4 hours to achieve a density of at least 95%. The sintered body was then hipped in an inert gas such as argon at between 1300° C. and 1500° C. for between 0.5 and 4 hours to achieve a density of at least 99.9%.

The resulting sintered ceramics were measured for density, hardness, strength, fracture toughness, phase, microstructure, thermal expansion coefficient and low temperature degradation resistance.

Density was measured by a water displacement method using deionized water and corrected for temperature. Density was found to be about 6.04 g/cc.

For hardness analysis, Vickers diamond pyramid hardness indentations from 1 kg loads were created. Vickers hardness was found to be about 13.5 GPa.

The 4-point flexure strength of the ceramics of the present invention were also determined. 3×4×50 mm type B specimens on a 40 mm outer span and a 20 mm inner span test jig (ASTM C1161-90) were selected. Assuming a Weibull modulus of about 10, it is believed this method reports a flexural strength which is about 20% lower than that found using JIS R 1601-81 (a 3-point test using a 30 mm span). The four point flexural strength was found to be about 1100 MPa.

In order to determine fracture toughness, the same MOR bars used to determine flexural strength were indented once at the center of the bar with a 20 Kgf load and then broken as above. The indentation was made in the middle of a drop of dried, silicon diffusion pump oil in order to minimize any environmental effects. Fracture toughness was determined by the fracture of 4 point bend specimens of 3×4×50 mm containing a Vickers indentation (10 kg load) on the tensile surfaces within the inner span, at a crosshead speed of about 0.5 mm/min, according to procedures described by P. Chantikul et al., in "A Critical Evaluation of Indentation Techniques for Measuring Fracture Toughness II: Strength Methods", *J. Am. Ceram. Soc.* 64(9), pp. 539–544 (1981). This method is believed to be more reliable and generally more conservative than large-crack size methods such as the SEPB, SENB and CVB methods. Fracture toughness was found to be about 4.8 MPa m$^{1/2}$.

Flexure strength is also recognized as one of the most effective methods of determining the low temperature degradation of a YTZP. Accordingly, LTD was determined by immersing the samples in liquid water having a temperature of 200° C., 250° C. and 300° C. for 48 hours in an autoclave and then measuring its flexural strength as above. the resulting flexural strengths were found to be about 1153 MPa, 1126 MPa, and 899 MPa. It is noted that the recorded strengths of the samples exposed to the 200° C. and 250° C. environments were higher than the unexposed samples.

For phase analysis, a short scan (2 alpha=27–32.5 degrees) X-ray diffraction (XRD) developed for zirconia was used to quantify phases on as-machined and autoclaved dense sample surfaces. XRD parameters were Cu K alpha, at 45 kV, 40 mA, step size=0.02 degrees, step frequency=5 sec. The present XRD short scan is effective to quantify monoclinic contents on the surface of the dense sample. In one test, a 4 mol % YTZP was immersed in 150° C. liquid water for 3 weeks in an autoclave. The surface concentration of monoclinic zirconia was determined in these samples. X-ray diffraction analysis revealed between about 3.3 and 6.5% monoclinic in the samples. At both the beginning and the end of the test, the material had a 4 point flexural strength of 996 MPa.

Small samples were sliced by a diamond saw, followed by successive polishing using diamond pastes. Polished samples were thermally etched for SEM observation. Grain size samples were measured via SEM by the linear intercept method, with a correction factor of 1.5. The average grain size of this material was found to be about 340 nm (0.34 μm).

Comparative materials were made in substantial accordance with Example I, except that yttria concentration was varied below and above 4 mol % yttria. The strength, toughness and LTD resistance of the comparative materials were then found via the techniques outlined above.

Table I below summarizes the strength, toughness and LTD resistance (as measured by room temperature 4 point flexural strength after immersion in 200–300° C. liquid water for 48 hours in an autoclave) of YTZP's having varying yttria contents. The table clearly shows that not only does 4.0 mol % YTZP have the adequate strength and toughness required for automotive plunger applications, it also has superior LTD resistance at 200° C. and 250° C.

TABLE I

| YTZP (mol %) | As-received strength (MPa) | Toughness (MPa m½) | Strength after 200° C. treatment | strength after 250° C. treatment | strength after 300° C. treatment |
| --- | --- | --- | --- | --- | --- |
| 3.0 | 1507 | 6.0 | 474 | 590 | 583 |
| 3.5 | 1063 | 5.5 | 742 | 847 | 728 |
| 3.75 | 1124 | 5.0 | 453 | 409 | 799 |
| 4.0 | 1100 | 4.8 | 1153 | 1126 | 899 |
| 4.5 | 1118 | 3.8 | 683 | 639 | 720 |
| 5.0 | 960 | 3.1 | 840 | 799 | 551 |
| 6.0 | 478 | 2.6 | no test | 99 | 65 |
| 8.0 | 314 | 1.9 | no test | 287 | 237 |

A 3 mol % YTZP and a 4 mol % YTZP were made in substantial accordance with Example I, and were immersed in a 48% fuel, 48% oil, 2% water mixture at 150° C. for 21 days in an autoclave to simulate a worst case timing plunger environment. The results, shown in Table II, indicate the 4 mol % material was superior to the 3 mol % material.

TABLE II

| Exposure Length | 3 mol % YTZP | 4 mol % YTZP |
| --- | --- | --- |
| As-received | 1103 MPa | 917 MPa |
| One week | 269 MPa | 869 MPa |
| Three Week | 152 MPa | 931 MPa |

In another test, zirconia ceramic stabilized by 2.7 mol %, 3 mol % and 4 mol % yttria were made in substantial accordance with Example I, subjected to a high temperature heat treatment for five minutes in an ambient atmosphere, and the surface of each ceramic was then analyzed for monoclinic content. The approximate results of this test are shown in Table III below. The results of these tests show the desirability of 4 mol % zirconia at temperatures above and below the 200–250° C. window suggested in Table I.

TABLE III

SURFACE MONOCLINIC CONTENT (%)

| TEMPERATURE | 2.7 mol % yttria | 3.0 mol % yttria | 4.0 mol % yttria |
| --- | --- | --- | --- |
| 25° C. | 0.9 | 0.9 | <0.3 |
| 200° C. | 1.2 | 1.3 | <0.3 |
| 250° C. | 1.1 | 1.4 | <0.3 |
| 300° C. | 1.5 | 1.4 | <0.3 |
| 400° C. | 2.3 | 1.1 | <0.3 |
| 500° C. | 3.3 | 1.1 | <0.3 |
| 700° C. | 1.6 | 0.6 | <0.3 |
| 1000° C. | 0.6 | <0.3 | <0.3 |

The LTD resistant property of zirconia stabilized within this narrow yttria window can be exploited in many different uses other than plungers. For example, it can be used in applications where the zirconia ceramic is exposed to a warm (i.e., about 37° C.) liquid comprising water, such as a bioprosthetic component shaped for use as a hip joint prosthesis head, a knee joint, an ankle joint, a finger joint, and a clavicle. It can be used in applications where the surface of the zirconia ceramic is exposed to saturated steam, such as in autoclaving. It can be used in applications where the zirconia ceramic is exposed to very high temperatures, such as a zirconia disk exposed to an inert gas at temperature of at least 400° C. It can be used in applications where the surface of the ceramic is mechanically stressed, such as a zirconia blade, or a zirconia bearing component (especially a bearing ball), or a zirconia metal forming die (especially a necking die), or a lapped surface. It can also be used as a ferrule or sleeve component of an optical fiber connector for connecting an optical fiber, wherein the ferrule has a hole for receiving and holding the optical fiber, and the sleeve has a suitable shape for connecting and holding the ferrule.

I claim:

1. A sintered ceramic consisting essentially of zirconia partially stabilized by between 3.8 mol % and 4.4 mol % yttria, wherein the ceramic has a flexural strength of at least 900 MPa after immersion in liquid water having a temperature of 250° C. for 48 hours in an autoclave.

2. The ceramic of claim 1 consisting essentially of zirconia partially stabilized by between 3.9 mol % and 4.1 mol % yttria.

3. The ceramic of claim 1 wherein the yttria content is within the range of 3.8 mol % to 4.4 mol % but not within the range of 3.9 mol % to 4.1 mol %.

4. The ceramic of claim 1 wherein the yttria content is within the range of 3.8 mol % to 4.4 mol % but not within the range of 3.95 mol % to 4.05 mol %.

5. A method of contacting LTD resistant zirconia with a high temperature atmosphere, comprising the steps of:
   a) providing a densified ceramic consisting essentially of zirconia partially stabilized by between 3.8 mol % and 4.4 mol % yttria, and
   b) contacting the ceramic with the high temperature atmosphere, the atmosphere consisting essentially of an inert gas at a temperature of at least 400° C.

6. The method of claim 5 wherein the ceramic is a disk having a diameter of at least 10 mm and a thickness of no more than 1 mm.

7. The ceramic of claim 1 wherein the porosity is characterized by a mean diameter of less than 0.1 um.

8. The ceramic of claim 7 characterized by less than 0.1 v/o porosity.

9. The ceramic of claim 1 having a toughness of at least 4.0 MPa m$^{1/2}$.

10. The ceramic of claim 1 having a toughness of at least 4.8 MPa m$^{1/2}$.

11. The ceramic of claim 1 characterized by a flexural strength of at least 900 MPa after immersion in liquid water having a temperature of 300° C. for 48 hours in an autoclave.

12. The ceramic of claim 1 characterized by a surface monoclinic content of between 3.3% and 6.5% after immersion in 150° C. liquid water for 3 weeks in an autoclave.

13. The ceramic of claim 1 characterized by a surface monoclinic content of less than 0.3% after a five minute exposure to a 500° C. ambient atmosphere.

14. The method of claim 5 wherein the ceramic has a porosity characterized by a mean diameter of less than 0.1 um.

15. The method of claim 5 wherein the ceramic is characterized by less than 0.1 v/o porosity.

16. The method of claim 5 wherein densified ceramic consists essentially of zirconia partially stabilized by between 3.9 mol % and 4.1 mol % yttria.

17. The method of claim 5 wherein the ceramic has a toughness of at least 4.0 MPa m$^{1/2}$.

18. The method of claim 5 wherein the ceramic has a toughness of at least 4.8 MPa m$^{1/2}$.

19. The method of claim 5 wherein the ceramic has a flexural strength of at least 900 MPa after immersion in liquid water having a temperature of 250° C. for 48 hours in an autoclave.

20. The method of claim 5 wherein the ceramic has a flexural strength of at least 900 MPa after immersion in liquid water having a temperature of 300° C. for 48 hours in an autoclave.

21. The method of claim 5 wherein the ceramic is characterized by a surface monoclinic content of between 3.3% and 6.5% after immersion in 150° C. liquid water for 3 weeks in an autoclave.

22. The method of claim 5 wherein the ceramic is characterized by a surface monoclinic content of less than 0.3% after a five minute exposure to a 500° C. ambient atmosphere.

* * * * *